United States Patent [19]

Browning et al.

[11] 3,774,460
[45] Nov. 27, 1973

[54] COMPACT TRANSMISSION STRUCTURE
[75] Inventors: Edgar Paul Browning; Lyle Robert Madson, both of Cedar Falls, Iowa
[73] Assignee: Deere & Company, Moline, Ill.
[22] Filed: June 9, 1972
[21] Appl. No.: 261,313

[52] U.S. Cl................. 74/15.84, 74/740, 192/48.7
[51] Int. Cl........................ F16h 37/00, F16d 21/08
[58] Field of Search.......................... 74/740, 15.84; 192/48.7, 3.52

[56] References Cited
UNITED STATES PATENTS

| | | | |
|---|---|---|---|
| 2,747,416 | 5/1956 | Swenson et al. | 74/15.84 |
| 2,871,726 | 2/1959 | Kamlukin | 74/740 X |
| 2,880,833 | 4/1959 | Stevenson et al. | 74/15.84 X |
| 2,982,153 | 5/1961 | Albertson et al. | 74/740 |
| 3,065,643 | 11/1962 | Mark et al. | 74/15.84 X |
| 3,589,483 | 6/1971 | Smith | 192/3.52 |

*Primary Examiner*—Arthur I. McKeon
*Attorney*—H. Vincent Harsha et al.

[57] ABSTRACT

The drive train of a sixteen-speed transmission commences at the end of an engine crankshaft with a traction input drive shaft, which is coaxially received in a hollow PTO input drive shaft, and a dual clutch assembly operable for selectively connecting one or the other or both of the drive shafts for rotation with the crank-shaft. The PTO input drive shaft terminates ahead of a two-speed planetary transmission section which has input gearing connected to an end of the traction input drive shaft and output gearing connected to a planetary output shaft. The PTO input drive shaft is connected for driving a PTO shaft which extends parallel thereto. An eight-speed transmission section includes parallel input, output and countershafts, the input shaft being axially aligned with and connected to the planetary output shaft. The transmission drive train is encased in an elongated housing having three spaced support walls which support the transmission shafts and planetary transmission section and which support and form a portion of control means for certain elements of the transmission.

9 Claims, 4 Drawing Figures

COMPACT TRANSMISSION STRUCTURE

BACKGROUND OF THE INVENTION

The present invention relates to a change-speed transmission and more particularly relates to an improvement of the transmission disclosed in U.S. Pat. No. 2,710,546 issued to DuShane et al. on 14 June 1955.

The transmission disclosed in the DuShane et al. patent is particularly suited for use in tractors and includes parallel arranged input, output and countershafts carrying constant mesh gearing. The input shaft carries a first clutch selectively operable for causing the countershaft to be respectively driven at low and high speeds. The first clutch includes synchronizing means permitting the clutch to be actuated with the vehicle in motion so that "up" or "down" shifting is permitted on the "go."

The output shaft carries second and third clutches which are selectively operable for establishing four different driving conditions between the countershaft and the output shaft whereby the latter may be driven at four different speeds for every speed of the countershaft. Thus, eight different output speeds are available through selective operation of the three clutches.

Only four of the eight forward speeds produce ground speeds in the working or 3-8 mph range. These four speeds are adequate for some operations but for many operations the speeds are too widely spaced to permit the tractor to be operated at or near a maximum speed for a given load imposed thereon. Also, since only the first clutch is operable on the go, the operator for some conditions must frequently stop the vehicle to change the driving relationship between the countershaft and the output shaft.

One design proposed for increasing the number of speeds available from a multi-speed transmission is disclosed in U.S. Pat. No. 3,352,166 granted to Marquart el al. on 14 Nov. 1967. In Marquart et al. a two-speed planetary transmission is used in conjunction with a multi-speed transmission for doubling the number of available output speeds. While this mode of increasing the speeds available from an existing multi-speed transmission is generally acceptable, the Marquart et al. transmission lacks lengthwise compactness, and requires the PTO input drive shaft to be specially constructed to bypass the planetary transmission section.

SUMMARY OF THE INVENTION

According to the present invention there is provided an improved transmission construction for overcoming the abovementioned shortcomings of the DuShane et al and Marquart et al patented transmission. Specifically, it is an object of the invention to modify the DuShane et al multi-speed transmission such that twice as many forward speeds are available, including twice as many available on the "go," while at the same time retaining the major design concepts of the DuShane et al transmission. Still more specifically, it is an object to accomplish such modification through the use of a dual-speed planetary transmission section.

Another object is to provide such a modified transmission which is compact lengthwise. Specifically, it is an object to provide a traction and PTO clutch arrangement and a planetary transmission section which are both compact in a direction lengthwise of the transmission.

Yet another object is to provide a PTO drive section which is of simple construction and bypasses the planetary and multi-speed transmission sections.

Still another object is to provide such a compact transmission wherein three support walls rotatably support the transmission shafts, support the planetary transmission section, and support and form a portion of controls for the traction and PTO clutches and for a PTO shaft brake.

These and other objects will become apparent from the following description and the appended drawings.

DESCRIPTION OF THE PREFERRED EMBODIMENT

Figure 1:
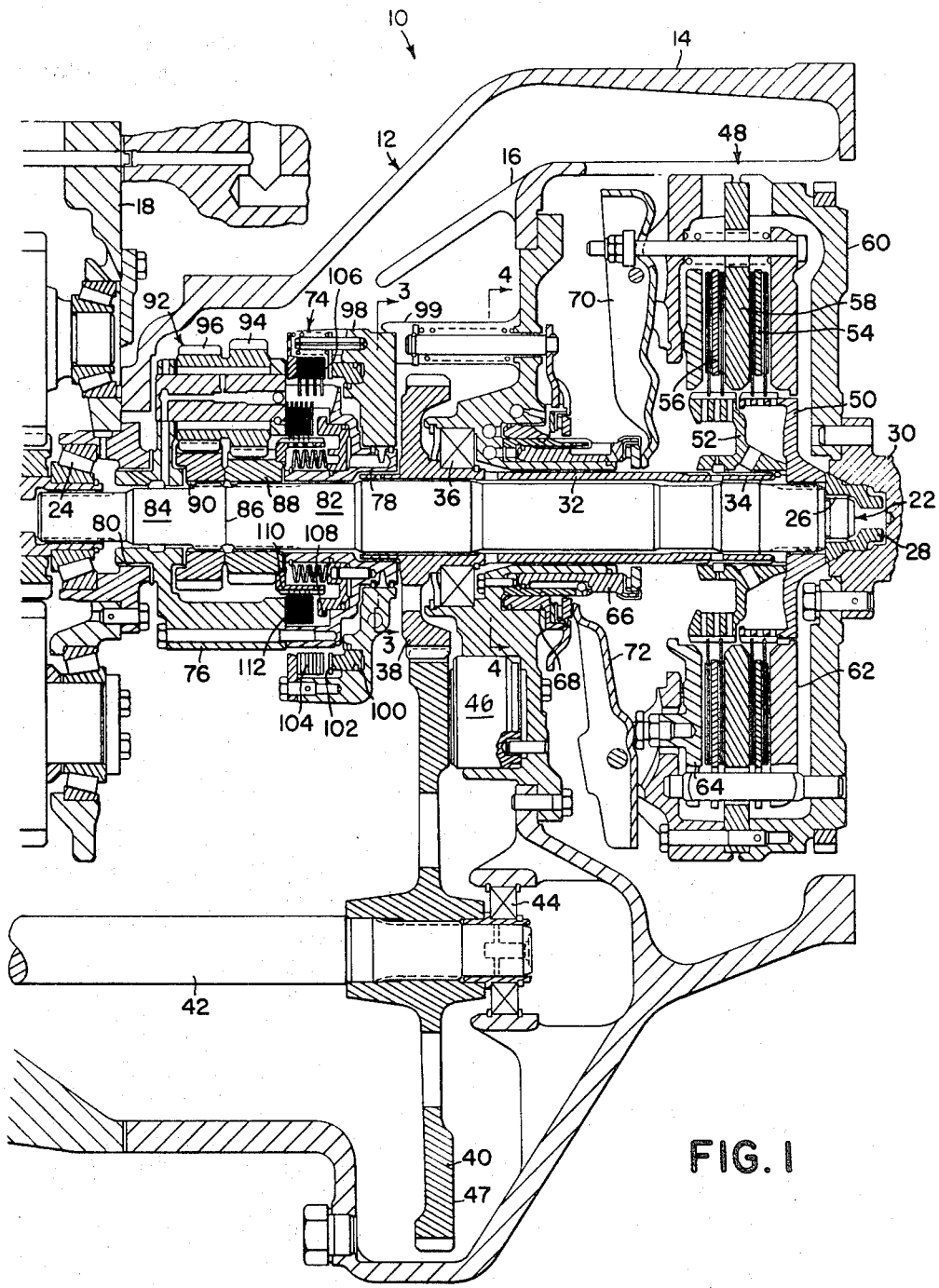
FIG. 1 is a longitudinal sectional view of a vehicle transmission showing that portion commencing at the end of the engine crankshaft.
Figure 2:
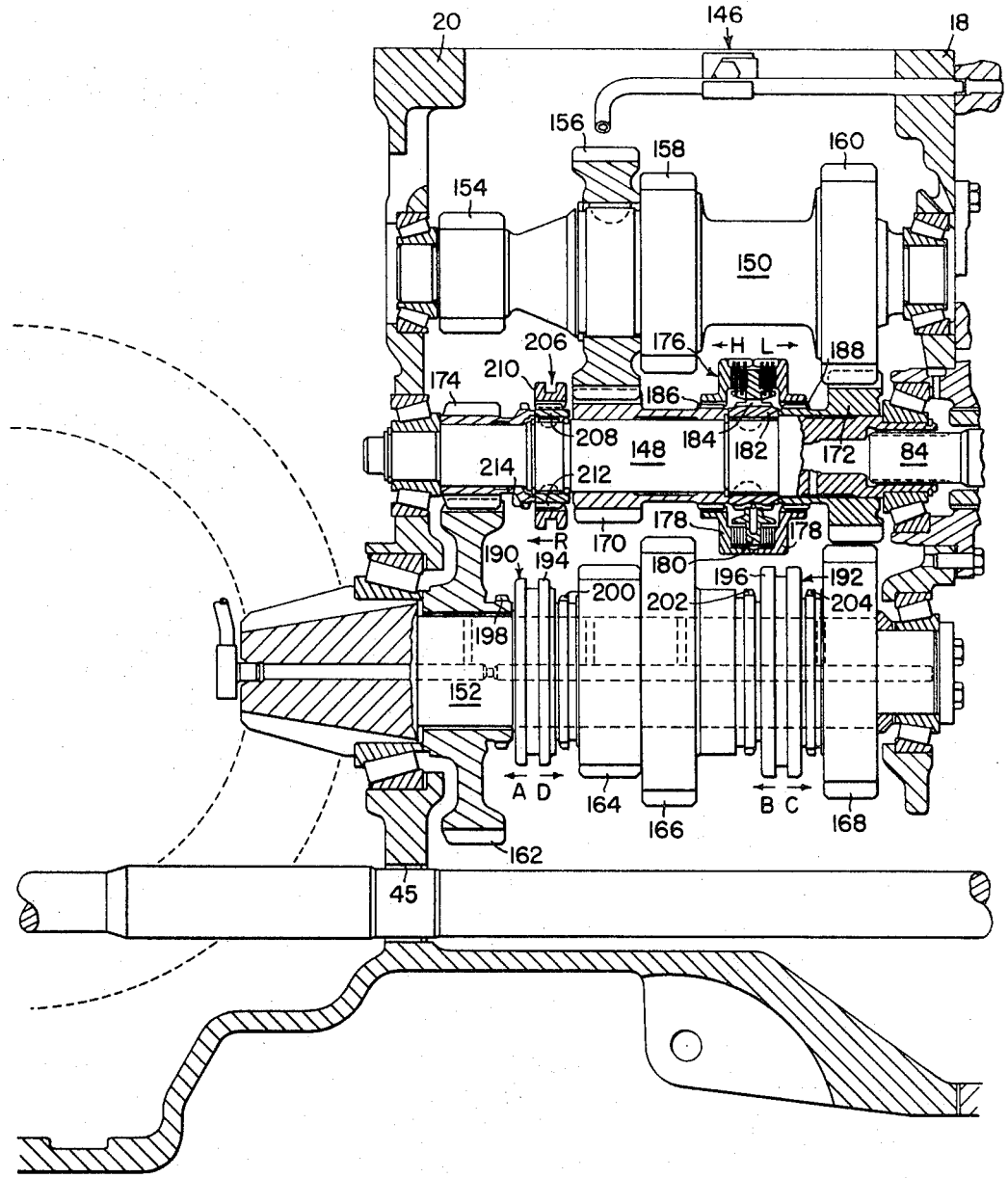
FIG. 2 is a longitudinal sectional view of the vehicle transmission shown in FIG. 1 but showing the multi-speed transmission section.

Referring now to FIGS. 1 and 2 of the drawing, therein is shown a vehicle transmission indicated in its entirety by the reference numeral 10. The transmission 10 includes a housing 12 including a generally cylindrical clutch housing portion 14 at its right end as viewed in FIG. 1. The left end of the housing portion 14 is delimited by a support wall 16, and spaced leftwardly from the support wall 16, as viewed in FIG. 1, is an intermediate support wall 18 which cooperates with a left end support wall 20, as viewed in FIG. 2, to provide support means for various transmission shafts to be described hereinafter.

With reference to FIG. 1, a traction input drive shaft 22 extends axially within the clutch housing portion 14 and is supported at its left end by a bearing 24 located in the support wall 18, and is supported at its right end by a bearing 26 located within a bushing 28 which is in turn fixed within a receptacle extending axially into the end of an engine crankshaft shown partially at 30. The traction input drive shaft 22 is received within a hollow power take-off (hereinafter abbreviated as PTO) input drive shaft having its right end supported by the shaft 22 as at a bearing 34, and having its left end supported as at a bearing 36 located within the support wall 16. The left end of the shaft 32 comprises an integrally formed gear 38 which is meshed in driving relationship with a gear 40, the gear 40 being fixed to a power take-off shaft 42 having its right end supported as at a bearing 44 fixed in the support wall 16. The power take-off shaft 42 extends through and is rotatably supported in the left end support wall 20 as at a bearing 45. A hydraulic brake piston 46 is axially shiftably mounted in the support wall 16 for selective braking engagement with an annular surface 47 formed on the gear 40.

Located in the clutch housing portion 14 is a dual clutch assembly 48. The dual clutch assembly 48 includes a traction clutch member 50 including a hub fixed for rotation with the traction input drive shaft 22 and a PTO clutch member 52 including a hub located axially adjacent the hub of the traction clutch member and being fixed for rotation with the power take-off input drive shaft 32. The hubs of the traction and PTO clutch members 50 and 52 respectively carry annular, axially shiftable friction elements 54 and 56. A backing plate 58 of annular shape is located between the traction clutch and power take-off clutch friction elements 54 and 56 respectively and is fixed to the rim portion of a flywheel 60 which is in turn fixed to the engine crankshaft 30. Respectively located on the opposite sides of the traction clutch and PTO clutch friction elements 54 and 56 from the backing plate 58 are a traction clutch pressure plate 62 and a PTO clutch pressure plate 64. The pressure plates 62 and 64 are mounted, in a manner well known in the art, for rotation with the flywheel 60 as well as for axial movment toward and away from the friction elements 54 and 56 to frictionally engage the latter with the backing plate 58. The pressure plates 62 and 64 are normally biased away from engagement with friction elements 54 and 56.

Actuating means are provided for shifting one or the other or both of the pressure plates 62 and 64 toward the backing plate 58 to respectively establish a driving relationship between the engine crankshaft 30 and one or the other or both of the traction and PTO input shafts 22 and 32, respectively, via the traction and PTO clutch friction elements 54 and 56. The actuating means includes annular ring-like hydraulic traction and PTO clutch actuating pistons 66 and 68 respectively. The pistons 66 and 68 are mounted in the support wall 16 in concentric relationship to each other and to the drive shafts 22 and 32. When pressure fluid is introduced at the left ends of the pistons 66 and 68, they shift rightwardly and respectively engage the inner ends of sets of radially extending traction clutch and power take-off clutch operating fingers, one of each set being respectively shown at 70 and 72. The sets of fingers 70 and 72 are arranged circularly about and are pivotally connected to the flywheel 60 and are respectively operatively connected to the pressure plates 62 and 64 for causing the latter to move the friction elements 54 and 56 into engagement with the backing plate 58 when the actuating pistons 66 and 68 are pressurized.

A two-speed planetary transmission section 74 is located in the housing 12 between the PTO drive gear 38 and the support wall 18. The planetary transmission section includes a carrier 76 having its right end journally supported on the hub of the gear 38, as at 78, and having its left end journally supported in the support wall 18, as at 80. The traction input drive shaft 22 is divided into an input section 82 and an output section 84, the sections 82 and 84 being in end-to-end abutment as at line 86. Respectively mounted on the shaft sections 82 and 84 for rotation therewith are side-by-side disposed input and output sun gears 88 and 90, respectively. A planet cluster gear 92 is rotatably mounted on the carrier 76 and includes gears 94 and 96 respectively meshed with the input and output sun gears 88 and 90. A support member 98 generally borders the right side of the planet carrier 76 and is integrally fixed to the partition wall 16 as at a wall portion 99 which extends annularly about the PTO drive gear 38. A ring-like brake actuating piston 100 is axially shiftably mounted in the support member 98 for movement toward the planet carrier 76 to move an annular pressure plate 102, also axially shiftably mounted on the support member 98, to bring friction elements 104 carried by the support member 98 into braking engagement with braking plates 106 carried by the carrier 76. Thus, actuation of the piston 100 causes the carrier 76 to be braked against rotation resulting in a condition wherein the power flows from the shaft section 82 through the input sun gear 88, and thence to the planet cluster 92 and out to the output shaft section 84 via the output sun gear 90. It is here noted that the planetary gearing is chosen such that the above-described condition of the planetary transmission section results in an underdrive situation wherein the output section 84 of the shaft 22 is driven at a slower speed than the input section 82 of the shaft 22.

A ring-like clutch actuating piston 108 is axially shiftably mounted in the carrier 76 for movement toward and for causing interengagement among friction disc elements 110 and 112 respectively carried by the input sun gear 88 and the carrier 76. Thus, when the clutch piston 108 is actuated, the input sun gear 88 is locked to the carrier 76 causing the output section 84 of the shaft 22 to turn at the speed of the input section 82 of the shaft 22. In other words, a direct drive condition is established in the planetary transmission section 74 when the clutch actuating piston 108 is actuated.

Figure 3:
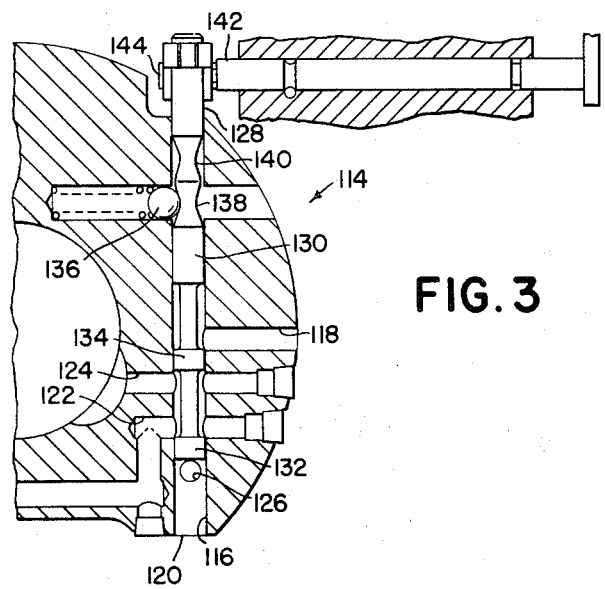
FIG. 3 is a view taken along line 3—3 of FIG. 1 and showing a control valve for routing actuating fluid to the clutch and brake means of the planetary transmission section.

For the purpose of controlling the flow of actuating fluid to and from the planetary brake and clutch pistons 100 and 108, respectively, a control valve 114 is provided in the support member 98. As viewed in FIG. 3, the control valve 114 includes a vertical valve bore 116 intersected by an upper sump port 118 and having a lower bottom end forming a lower sump port 120. A pressure fluid inlet port 122 intersects the bore approximately midway between the upper and lower sump ports, a clutch control port 124 is located between the upper sump port 118 and the fluid inlet 122, and a brake control port 126 is located between the lower sump port 120 and the fluid inlet 122. A valve spool member 128 is slidably mounted in the valve bore 116 and includes upper, lower and intermediate lands 130, 132 and 134, respectively. The valve spool member 128 is shown positioned for routing fluid pressure to the planetary clutch actuating piston 108. In this position, the lower land 132 is located between the inlet and lower sump ports 122 and 120, respectively, while the intermediate land 134 is located between the clutch control and upper sump ports 124 and 118, respectively. In order to disengage the clutch and engage the brake, the valve spool member 128 is shifted downwardly from the position shown to a lower position wherein the lower land 132 is located between the inlet and lower sump ports 122 and 120, respectively, and wherein the intermediate land 134 is located between the inlet and clutch control ports 122 and 124, respectively. The valve spool member 128 is respectively held in its operative position by means of a spring biased detent ball 136 which alternately engages lower and upper detent depressions 138 and 140, respectively, when the spool member 128 is in its upper and lower operative positions. For the purpose of moving the valve spool member 128 between its detented positions, a rotatable control rod 142 is linked to the top of the spool member, as at 144.

Referring now to FIG. 2, the transmission 10 includes an eight-speed transmission section 146 located between the support walls 18 and 20 and including parallel arranged input, counter and output shafts 148, 150 and 152, respectively, these shafts having their opposite ends respectively rotatably mounted in the support walls 18 and 20. The right end of the input shaft 148 is fixed for rotation with the output section 84 of the traction input drive shaft 22. It is noted that the countershaft 150 is shown displaced upwardly from its true position in order that the structure thereof may be more readily perceived.

Proceeding from left to right, the countershaft 150 has axially spaced thereon and fixed thereto a small countershaft gear 154, a large countershaft gear 156, a first intermediate countershaft gear 158 and a second intermediate countershaft gear 160, the gear 158 being smaller than the gear 160.

Bearing in mind that the countershaft 150 is not in its true position, the output shaft 152 has independently journaled thereon a larger output gear 162, a small output gear 164, a first intermediate output gear 166 and a second intermediate output gear 168, these gears being respectively in constant mesh with the countershaft gears 154, 156, 158 and 160.

The input shaft 148 has journaled thereon a low-range or speed input pinion 170 and a high-range or speed input pinion 172. The input pinion 170 is in constant mesh with the larger countershaft gear 156 and the input pinion 172 is in constant mesh with the second intermediate countershaft gear 160. Also journaled on the input shaft is a reverse pinion 174 which is in constant mesh with the large output gear 162. Since the output gear 162 is in constant mesh with the small countershaft gear 154, it follows that positive connection of the reverse pinion 174 to the input shaft 148 will drive the countershaft in a reverse direction, whereas positive connection of the input shaft to either of the input pinions 170 and 172 will drive the countershaft in a forward direction at one or the other of two different range or speed ratios.

For the purpose of selectively establishing either a low or a high range driving connection between the input shaft 148 and the countershaft 150, the transmission includes a dual-speed or range selector clutch 176 located between the input pinions 170 and 172. The dual-range clutch 176 includes a pair of synchronizer rings 178 located at the opposite sides of a synchronizer member 180, the latter being splined to a hub 182 as at 184. One of the synchronizer rings 178 is splined as at 186 to the input pinion 170 while the other synchronizer ring 178 is splined as at 188 to the input pinion 172. When the synchronizer rings 178 are shifted in the direction of an arrow L, synchronization occurs between the rear ring 178 and the synchronizer member 180, after which the splined connection at 186 is carried over the splines 184 on the hub 182. Thus, the hub 182, the low range pinion 170 and a rear synchronizer ring 178 are connected for rotation in unison. This positively connects the low-range pinion 170 to the input shaft 148. Shifting of the synchronizer rings 178 in the opposite direction, in the direction of an arrow H, first synchronizes the front ring 178 and the synchronizer member 180 and causes positive engagement between the high-range pinion 172 and input shaft hub 182 by means of carrying over the splined connection at 188 to the hub splines 184.

When the countershaft speed selector clutch 176 effects engagement between the input shaft and the input pinion 170, for example, the countershaft is driven at a speed determined by the relative pitch diameters between the pinion 170 and the large countershaft gear 156. Likewise, when the clutch 176 is shifted to effect a positive connection between the input shaft and the large input pinion 172, the countershaft will be driven at a higher speed determined by the ratio between the pitch diameters of the pinion 172 and the intermediate countershaft gear 160. Operation of the clutch 176 in one direction or the other is exclusive as well as selective; that is to say, both pinions 170 and 172 cannot be simultaneously connected to the input shaft.

Since the input shaft 148 may be driven at either one of two speed ratios by the planetary transmission section described above and the countershaft may in turn be driven at either one of the two speed ratios mentioned above, it follows that any variety of selective speeds taken off from the countershaft may be quadrupled, which is just the result accomplished here. As previously outlined, the countershaft gears 154, 156, 158 and 160 are respectively in constant mesh with the countershaft gears 162, 164, 166 and 168. Therefore, if any one of the output shaft gears is positively connected to the output shaft, the output shaft will rotate at a speed determined by the ratio between the pitch diameters of the meshing and driving countershaft and output gears. For selectively establishing driving connections between the gears, the output shaft carries thereon first and second output shaft clutches 190 and 192, which are of similar construction. Specifically, the clutches 190 and 192 respectively include central rings, not shown, keyed to the output shaft intermediate the output gears 162 and 164 and intermediate the output gears 166 and 168. Internal rings are externally splined and the clutches 190 and 192 respectively include internally splined external rings 190 and 192 which are axially shiftably mounted on the splines of the outer rings 60. The external ring 194 is shiftable in the direction of the arrow A to bring the internal splines thereof into driving engagement with teeth 198 formed on the hub of the gear 162 to establish a slow range of driving speed in the transmission, as will be further explained below. Similarly, the external ring 194 is shiftable in the direction of the arrow D to drivingly engage teeth 206 formed on the hub of the gear 164 for establishing a transport range of speeds in the transmission. The external ring 196 is likewise oppositely axially shiftable in the direction of the arrows B and C to respectively drivingly engage teeth 202 on the hub of the gear 166 and teeth 204 on the hub of the gear 168 to respectively establish intermediate and transport ranges of speeds in the transmission.

The eight-speed transmission section 146 is placed in condition for producing a reverse output by means of a reverse clutch 206 located on the input shaft 148 between the low speed input pinion 170 and the reverse pinion 174. The reverse clutch 206 is similar in construction to the output clutches 190 and 192 and includes an internal ring 208 keyed to the shaft 148. An external ring 210 is axially shiftably splined, as at 212, to the internal ring and is shiftable in the direction of the arrow R to drivingly engage teeth 214 located on the hub of the reverse pinion 174. With this engagement being established, the output shaft 152 may be driven at different reverse speeds by selectively fixing the output gears 162, 164, 166 and 168 to the output shaft through selective actuation of the output clutches 190 and 192. Two speeds of course are made available for each selection of the gear according to whether the planetary transmission section is in a direct or underdrive condition.

Figure 4:
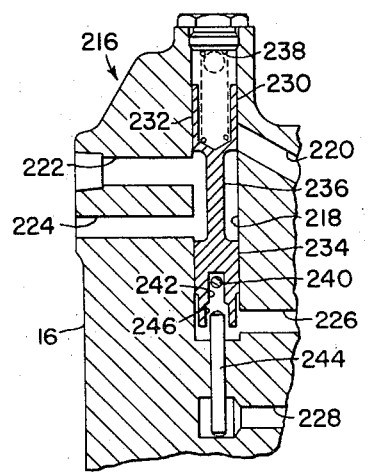
FIG. 4 is a view taken along line 4—4 of FIG. 1 and showing a control valve for routing lubrication fluid to the traction and PTO clutches.

In order to increase the wear life of the traction and PTO clutch friction elements 54 and 56, the backing plate 58 and the pressure plates 62 and 64, fluid is supplied for lubricating and cooling the interfaces of the friction elements and the plates during their engagement. The flow of lubrication fluid is controlled in part by a pilot-operated, pressure responsive valve 216, shown in FIG. 4. The valve 216 is carried by and partially formed by the support wall 16. Specifically, the valve 216 comprises a bore 218 formed vertically in the support wall 16 and intersected at axially-spaced locations by a pressure fluid outlet port 220, a pressure fluid inlet port 222, an exhaust port 224, a first pilot pressure port 226 and a second pilot pressure port 228, the ports being respectively arranged serially from the top to the bottom of the bore 218. For the purpose of controlling the flow among the inlet, exhaust and outlet ports, a valve spool 230 is slidably mounted in the bore 218. The spool 230 comprises upper and lower lands 232 and 234, respectively, separated by an intermediate annular groove 236. The spool is shiftable, in a manner to be presently described, among a lower position (the position shown) wherein the inlet and exhaust ports are connected via the groove 236 and the upper land blocks the outlet port, an intermediate position wherein the upper land 232 blocks only a portion of the outlet port, the inlet and outlet ports are interconnected and the lower land 234 partially blocks the exhaust port, and an upper position wherein the inlet and outlet ports are connected in full-fluid communication and the lower land blocks the exhaust port. The valve spool 230 is normally biased to its lower position by a spring 238 which acts between the spool and a plug in the upper end of the bore. The valve spool is limited in its downward movement by a stop pin 240 which traverses the bore 218 at a location between the exhaust and first pilot pressure ports and engages the bottom of a notch 242 extending upwardly in the bottom end of the spool.

The valve spool 230 is shiftable in response to the actuating pressures respectively located in the respective cylinders at the left ends of the pistons 66 and 68 and to accomplish this function, the pilot pressure ports 226 and 228 are respectively connected, by means not entirely shown, to the cylinders at the left ends of the pistons 66 and 68. The valve bore 218 includes a reduced in diameter portion extending between the pilot pressure ports and reciprocably mounted in the portion is a pilot or valve spool actuating pin 244, which also serves to prevent the flow of fluid between the pilot pressure ports.

When both of the pistons 66 and 68 are disengaged, the pin 244 occupies a lower position wherein the bottom of the pin rests on a wall forming the bottom of the bore and the upper end of the pin is received in the lower portion of a bore 246 extending axially into the lower end of the spool 230 coextensively with, and approximately half the distance as, the notch 242. It is to be noted that the notch is dimensioned so as not to permit the passage of the pin.

When only the piston 68 is pressurized for engagement, the pin 244 will be shifted upwardly by pressure in the pilot port 228 to engage the top of the pin with the end of the bore 246 resulting in the valve spool then being shifted to its intermediate position wherein the upper end of the pilot pin engages the stop pin 240.

When both pistons 66 and 68 are pressurized for engagement, or when only the piston 66 is pressurized for engagement, the spool 230 will be shifted to its upper position by pilot pressure in the port 226.

It is apparent then that the features which lend to the longitudinal compactness of the transmission described above are the dual clutch assembly 48, the use of the support wall 16 to support control means as well as shafts, the placement of the PTO drive gear 38 and the manner in which the wall 16 is shaped to accommodate the gear and at the same time support the support member 98 of the planetary transmission section and the particular planetary transmission arrangement of having the brake and clutch means at one end thereof.

Also, it is apparent that the transmission has been made compact while still retaining the desirable feature of having the PTO transmission section independent of the planetary and multi-speed transmission sections and adding other desirable features including lubrication means and hydraulic actuator means for the traction and PTO clutches.

We claim:

1. A compact transmission for a tractor, or the like, comprising: an elongate hollow housing having a generally cylindrical portion at one end defining a clutch housing; first, second and third support walls being integral with and extending transversely to the elongate housing at spaced locations respectively arranged serially from a location spaced from said one end of the elongate housing; said first support wall defining an inner end wall of the clutch housing; a hollow PTO input drive shaft extending within and coaxially to said clutch housing and having one end extending through and rotatably supported in said first support wall; a traction input drive shaft extending coaxially through said PTO input drive shaft and having an end rotatably supported in said second support wall; a PTO shaft extending parallel to said PTO input drive shaft and having one end rotatably mounted in said first support wall, the PTO shaft extending through and being rotatably supported in said third support wall; a dual-clutch assembly being located within said clutch housing and including PTO and traction clutch friction elements which are selectively actuatable for causing one or the other or both of said input drive shafts to be driven; PTO drive and driven gears being in constant mesh and respectively fixed for rotation with said PTO input drive and PTO shafts at respective locations adjacent that side of the first support wall which is remote from the dual-clutch assembly; said traction input drive shaft being separated at a location between said first and second support walls thus forming two shaft sections; a two-speed planetary transmission section located between said first and second support walls and having drive means connecting said two shaft sections; said planetary transmission section including a housing portion at one end fixed to said first support wall and located adjacent said PTO drive gear; a multi-speed transmission section including parallel input, counter and output shafts and being located between and each having their opposite end rotatably mounted in said second and third support walls; and said input shaft of the multi-speed transmission section being fixed to and arranged in axial alignment with the traction input drive shaft.

2. The transmission defined in claim 1 and further including PTO and traction clutch control means for actuating the friction elements of the PTO and traction clutch assembly; said control means being carried by and including a portion of said first support wall.

3. The transmission defined in claim 1 and further including brake means for selectively retarding the speed of said driven PTO gear and said brake means being carried by and including a portion of said first support wall.

4. The transmission defined in claim 1 wherein the dual-clutch assembly is a wet clutch requiring lubrication; and further including a lubrication fluid control valve means for controlling the flow of fluid to the dual-clutch assembly and said lubrication fluid control valve being carried by and including a portion of said first support wall.

5. The transmission defined in claim 1 wherein the two-speed planetary section includes a hydraulic brake actuating piston, a hydraulic clutch actuating piston and a shiftable control valve for controlling the flow of fluid to and from the pistons; said pistons and control valve being located in and including a portion of said housing portion of the planetary transmission section.

6. The transmission defined in claim 2 and further including brake means for selectively retarding the speed of said driven PTO gear and said brake means being carried by and including a portion of said first support wall.

7. The transmission defined in claim 6 wherein the dual-clutch assembly is a wet clutch requiring lubrication; and further including a lubrication fluid control valve means for controlling the flow of fluid to the dual-clutch assembly and said lubrication fluid control valve being carried by and including a portion of said first support wall.

8. The transmission defined in claim 7 wherein the two-speed planetary section includes a hydraulic brake actuating piston, a hydraulic clutch actuating piston and a shiftable control valve for controlling the flow of fluid to and from the pistons; said pistons and control valve being located in and including a portion of said housing portion of the planetary transmission section.

9. A compact transmission for a tractor, or the like, comprising: a hollow PTO input drive shaft; a traction input drive shaft extending coaxially through said PTO input drive shaft; a PTO shaft extending parallel to said PTO input drive shaft and overlapping one end thereof and one end of said traction input drive shaft; a drive gear fixed to said one end of the PTO input drive shaft for rotation therewith; a driven gear fixed to said PTO shaft and meshed with said drive gear; said one end of the traction input drive shaft being spaced from the drive gear; a two-speed planetary transmission section having a housing positioned adjacent said drive gear; said housing defining an opening receiving said traction input drive shaft; an input sun gear being fixed to said one end of said traction input drive shaft; a planetary output shaft axially aligned with said traction input drive shaft and having one end in abutment with said one end thereof; an output sun gear being fixed to said one end of the planetary output shaft; planetary carrier and planet gear means providing a driving connection between said input and output sun gears; an eight-speed transmission section having parallel input, output and countershafts; the input of said eight-speed transmission section being in axial alignment with and fixed for rotation with said planetary output shaft.

* * * * *